United States Patent [19]

Savaglio et al.

[11] Patent Number: 4,864,570
[45] Date of Patent: Sep. 5, 1989

[54] PROCESSING PULSE CONTROL CIRCUIT FOR USE IN DEVICE PERFORMING SIGNATURE ANALYSIS OF DIGITAL CIRCUITS

[75] Inventors: Robert J. Savaglio, Jericho; Peter A. Twombly, Winooski, both of Vt.

[73] Assignee: International Business Machines Corporation, Armonk, N.Y.

[21] Appl. No.: 67,181

[22] Filed: Jun. 29, 1987

[51] Int. Cl.$^4$ ............................................. G01R 31/28
[52] U.S. Cl. .................................................... 371/22.4
[58] Field of Search .................................... 371/25, 15

[56] References Cited

U.S. PATENT DOCUMENTS

| | | | |
|---|---|---|---|
| 3,740,646 | 6/1973 | McMahon, Jr. | 324/73 R |
| 4,357,703 | 11/1982 | Van Brunt | 371/15 |
| 4,441,074 | 4/1984 | Bockett-Pugh et al. | 324/73 R |
| 4,510,572 | 4/1985 | Reece et al. | 364/489 |
| 4,513,418 | 4/1985 | Bardell, Jr. et al. | 371/25 |
| 4,534,028 | 8/1985 | Trischler | 371/25 |
| 4,534,030 | 8/1985 | Paez et al. | 371/25 |
| 4,601,033 | 7/1986 | Whelan | 371/25 |

Primary Examiner—Charles E. Atkinson
Attorney, Agent, or Firm—Sughrue, Mion, Zinn, Macpeak & Seas

[57] ABSTRACT

A processing pulse control circuit for use in treating indeterminate signature increments in an apparatus producing RPT signature analysis of digital circuits. A circuit to control clock pulses to processing devices is provided. The circuit includes a counter to produce a count corresponding to the number of clock pulses received, and also a memory which stores clock count values where indeterminate signature increments will be encountered. A comparator compares the actual clock count values with the stored clock count values to produce a control signal. In response to this control signal, clock pulses are normally allowed to pass to a processing device during clock pulse counts at which determinate signature increments are encountered, but are blocked where indeterminate signature increments are encountered.

11 Claims, 4 Drawing Sheets

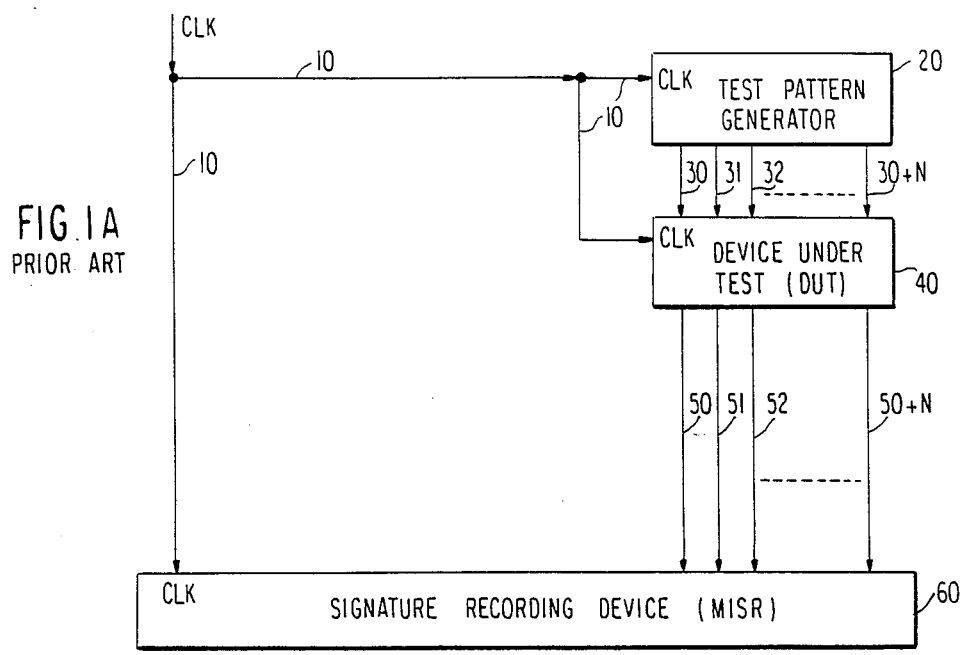
FIG. 1A PRIOR ART
FIG. 1B — TEST PATTERN INCREMENTS
|  | TEST PATTERN BIT LINE | | | | |
|---|---|---|---|---|---|
| CLOCK PULSE | | 30 | 31 | 32 | ----- | 30+N |
| | 1 | 0 | 1 | 0 | ----- | 0 |
| | 2 | 1 | 1 | 1 | ----- | 1 |
| | 3 | 1 | 1 | 0 | ----- | 0 |
| | 4 | 1 | 0 | 0 | ----- | 1 |
| | 5 | 0 | 0 | 0 | ----- | 1 |
FIG. 1C — SIGNATURE PATTERN INCREMENTS
|  | SIGNATURE PATTERN BIT LINE | | | | |
|---|---|---|---|---|---|
| CLOCK PULSE | | 50 | 51 | 52 | ----- | 50+N |
| | D | 1 | 1 | 0 | ----- | 1 |
| | D+1 | * | * | 1 | ----- | 0 |
| | D+2 | 0 | 0 | 1 | ----- | 0 |
| | D+3 | 1 | 0 | 0 | ----- | 0 |
| | D+4 | 0 | * | 1 | ----- | * |
FIG. 1D CLOCK PULSES
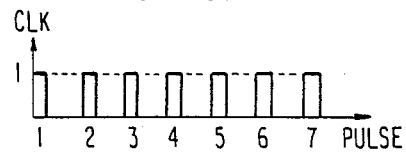
FIG. 1E RECORDING PULSES
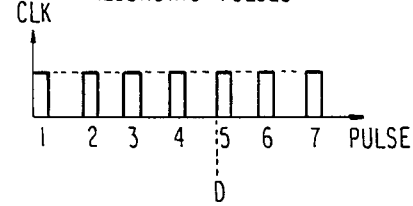

FIG.2B – TEST PATTERN INCREMENTS

| | TEST PATTERN BIT LINE | | | | |
|---|---|---|---|---|---|
| CLOCK PULSE | | 30 | 31 | 32 | ----- | 30+N |
| 1 | 0 | 1 | 0 | ----- | 0 |
| 2 | 1 | 1 | 1 | ----- | 1 |
| 3 | 1 | 1 | 0 | ----- | 0 |
| 4 | 1 | 0 | 0 | ----- | 1 |
| 5 | 0 | 0 | 0 | ----- | 1 |

FIG.2C – SIGNATURE PATTERN INCREMENTS

| | SIGNATURE PATTERN BIT LINE | | | | |
|---|---|---|---|---|---|
| CLOCK PULSE | | 50 | 51 | 52 | ----- | 50+N |
| D | 1 | 1 | 0 | ----- | 1 |
| D+1 | * | * | 1 | ----- | 0 |
| D+2 | 0 | 0 | 1 | ----- | 0 |
| D+3 | 1 | 0 | 0 | ----- | 0 |
| D+4 | 0 | * | 1 | ----- | * |

FIG.2D CLOCK PULSES

FIG.2E RECORDING PULSES

FIG.2F – GATE OUTPUTS

| | GATE OUTPUT LINES | | | | |
|---|---|---|---|---|---|
| CLOCK PULSE | | 150 | 151 | 152 | ----- | 150+N |
| D | 1 | 1 | 0 | ----- | 1 |
| D+1 | – | – | 1 | ----- | 0 |
| D+2 | 0 | 0 | 1 | ----- | 0 |
| D+3 | 1 | 0 | 0 | ----- | 0 |
| D+4 | 0 | – | 1 | ----- | – |

RECORDED SIGNATURE
INCREMENT BIT
TOTALS

| ADDER OUTPUTS |
|---|
| 3 |
| 1 |
| 1 |
| 1 |
| 1 |

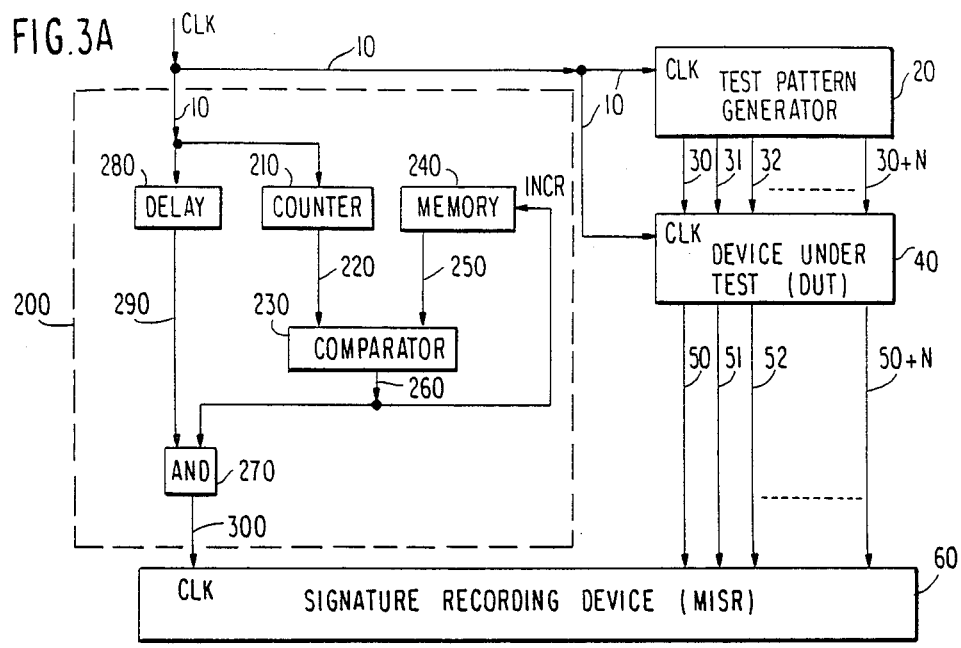

PROCESSING PULSE CONTROL CIRCUIT FOR USE IN DEVICE PERFORMING SIGNATURE ANALYSIS OF DIGITAL CIRCUITS

BACKGROUND OF THE INVENTION

1. Field of the Invention

The present invention relates to a processing pulse control circuit for use in devices performing signature analysis of digital circuits.

2. Description of the Prior Art

Parallel with the recent exponential growth in the use of Large Scale Integrated (LSI) digital circuits has come the development of a number of different approaches directed toward testing for the correct operation of these digital circuits. U.S. Pat. No. 4,441,074, issued to Bockett-Pugh et al, discloses a digital circuit tester for performing signature analysis, whereby faults in the signature analysis can be exactly located and recorded for subsequent inspection. U.S. Pat. No. 4,510,572, issued to Reece et al, discloses an entire complex digital system analyzer wherein the data signature at different nodes in a device under test can be tested. Other examples of different prior art approaches include: U.S. Pat. No. 4,513,418 issued to Bardell, Jr.; U.S. Pat. No. 4,534,028 issued to Trischler; and U.S. Pat. No. 4,357,703 issued to Van Brunt.

The general test approach to which the present invention is directed is that of signature analysis of a device in response to a digital test pattern. A description of a simplified form of such a signature analysis system follows.

In the simplified signature analysis approach shown in FIG. 1A, a clock pulse is applied along lines 10 to a test pattern generator 20. A graph of the clock pulses applied to the device along lines 10 is shown in FIG. 1D. The test pattern generator 20 outputs a digital test pattern to be inputted to a device under test (DUT), to facilitate signature analysis of that device. The test pattern is outputted along lines 30, 31, 32. . . 30+N, and is in the form of binary logic values (i.e. 1's and 0's). The number of bits in the test pattern outputted per clock pulse corresponds to the number of bits processed by the device under test. Every time a clock pulse is received along lines 10, a test pattern increment is outputted as indicated in FIG. 1B. The overall sequence of these test pattern increments corresponds to the test pattern.

The test pattern increments outputted along the lines 30, 31, 32, . . . 30+N are fed to the inputs of a device under test (DUT) 40. The clock pulses are also fed to the device under test 40 along lines 10. Upon receipt of the next clock pulse along lines 10, the device under test 40 inputs the test pattern increment available at its inputs. The test pattern increment is then processed by the device under test 40 in synchronization with the clock pulses received along lines 10, and a signature pattern increment is generated in response thereto. The signature pattern increment outputted along the signature pattern bit lines 50, 51, 52. . . 50+N is also of the form of logical 1's and 0's as indicated in FIG. 1C. The number of bits in a signature pattern increment is unique to each type of device 40, and may vary from one bit to eight bits, or more.

Several aspects should be noted about FIG. 1C. First, the clock pulse counts D, D+1, D+2, etc. in FIG. 1C correspond to the clock pulse counts 1, 2, 3, etc. in FIG. 1B. D is the delay time which corresponds to the number of clock pulses required for the first signature pattern increment to emerge from the device under test 40. This delay occurs because it takes several clock pulses for the test pattern increment to be inputted to the device under test 40, and then it may take several more clock pulses for the device under test 40 to process the test pattern increment and output the signature pattern increment.

The signature pattern increments outputted by the device 40 along signature pattern bit lines 50, 51, 52 . . . 50+N are fed to the inputs of a signature recording device 60 which also has a clock input fed by lines 10. In this prior art device shown in FIG. 1A, the recording pulses applied to the signature recording device 60 correspond to the clock pulses applied to the device 40 along lines 10. There is a one-to-one correspondence between the clock pulses shown in FIG. 1D and the recording pulses shown in FIG. 1E. Upon receipt of each clock pulse along lines 10, the signature recording device 60 records all signature pattern increments available at its inputs. The signature recording device 60 may be of a Multiple Input Shift Register (MISR) type construction, or any other suitable construction which facilitates the recording of the signature pattern increments.

Once recorded in the signature recording device 60, the entire signature pattern of the device under test 40 is compared to the signature pattern of a known good device. If the signatures are found to match, the device under test 40 is considered a good device. If the signatures differ, the device under test 40 is considered defective.

In the past, the digital test pattern was a unique series of digital inputs which was especially formulated to correspond to completely test a particular type of device. This approach has been found very expensive and time consuming in this age of Very Large Scale Integrated Circuits (VLSIC), because the digital test pattern for a VLSIC often encompasses a series of millions of digital inputs which must be formulated and, then, supplied to the testing site to be input to the test pattern generator 20.

As a result, there has been a trend in the semiconductor testing industry toward conducting Random Pattern Testing (RPT) of VLSIC devices. In this approach, a pseudo-random digital pattern is used as a test pattern in testing VLSIC devices. The testing pattern is described as pseudo-random because the pattern used is actually known, and is permanently stored in the testing equipment to be generically applied in the testing of all types of VLSIC devices.

Although the RPT testing approach is advantageous in that a unique testing pattern need not be formulated and input for each type of device to be tested, there is a tradeoff with corresponding disadvantages. The major disadvantage is that the pseudo-random test pattern may not be an ideal testing pattern to test a particular type of VLSIC device. One result which often occurs is that many signature pattern increments may be worthless for signature analysis because they represent "indeterminate" signature increments. An "indeterminate" signature increment, as opposed to a "determinate" signature increment, will now be further explained with reference to FIG. 1C.

A signature pattern increment of a device under test 40 is "determinate" when the output signature pattern increment for a given test pattern increment would be stable if repeatedly tested. In FIG. 1C, for example, clock pulse counts D, D+2 and D+3 all have normal determinate signature pattern increments, and are represented by 1's and 0's along the signature pattern bit lines 50, 51, 52 ... 50+N.

In contrast, a signature pattern increment of a device under test 40 is "indeterminate" when the output signature pattern increment for a given test pattern increment would be unstable (i.e. unpredictable) if repeatedly tested. A term often used synonomously for "indeterminate signature pattern increment" is "X-state". FIG. 1C also includes indeterminate signature pattern bits (indicated by *'s) along the signature pattern bit lines 50, 51 and 51, 50+N for clock pulse counts D+1 and D+4, respectively. Thus, the signature pattern increments at clock pulse counts D+1 and D+4 represent counts where indeterminate signature pattern increments will occur.

The above described signature analysis system of FIG. 1A has been found disadvantageous in that indeterminate signature pattern increments, which are useless in signature comparison, are also recorded by the signature recording device 60. Therefore, such a signature analysis system is indeterminate in terms of device signature recording.

One prior art device which attempts to overcome this inefficiency is that disclosed by McMahon in U.S. Pat. No. 3,740,646, and it will be described with reference to FIG. 2A of the present application. Elements with functions matching those shown in FIG. 1A are given the same reference numerals. FIGS. 2B and 2C exactly correspond to FIGS. 1A and 1B.

Turning now to FIG. 2A, there is shown a signature analysis system which is similar to that in FIG. 1A, with additional elements being shown within the dashed area 70. A clock line 80 receives the clock pulses along lines 10 and applies these pulses to the count input of an increment counter 90. The clock pulses applied to the device 40 via lines 10 and to the increment counter via line 80 are shown in FIG. 2D which exactly corresponds to FIG. 1D.

Increment counter 90 produces a count which corresponds to the number of clock pulses which has been received along clock line 80. The count output from increment counter 90 is applied along lines 100 to the address inputs of a memory 110 to address a memory location corresponding to the count output. The contents at this memory location are outputted as 1's and 0's bits on lines 120, 121, 122 ... 120+N. As will become clear in the discussion to follow, both the number of memory 110 output bits and the number of bit lines 120, 121, 122 ... 120+N must exactly match the number of signature pattern bit lines 50, 51, 52 ... 50+N.

The output bits on lines 120, 121, 122 ... 120+N are applied to the control inputs of gates 130, 131, 132 ... 130+N, respectively. Thus, the memory bits of 1's and 0's in the memory 110 are used to control the gating action of the gates 130, 131, 132 ... 130+N.

Gates 130, 131, 132 ... 130+N, in turn, receive as inputs the bits of the signature pattern increments on the signature pattern bit lines 50, 51, 52 ... 50+N, respectively. If the appropriate control bit has been applied to a respective gate 130, 131, 132 ... or 130+N, the bit of the signature pattern increment will be allowed to pass through the gate.

The chart of FIG. 2F shows examples of the gate outputs which are applied to parallel adder 140 along lines 150, 151, 152, ... 150+N. Note that the symbol "—" indicates an indeterminate signature pattern bit which has not been allowed to pass through a gate 130, 131, 132, ... or 130+N. An example is shown in FIG. 2F for the gate output line 150 at the clock pulse count D+1 (directly corresponding to the indeterminate signature pattern bit at line 50 and clock pulse count D+1 in FIG. 2C).

As shown in FIG. 2A, the parallel adder 140 adds the number of logical 1 bits received during a signature pattern increment, and this signature increment bit total is applied via lines 160 to the inputs of a signature recording device 60. As was the case for the device described with respect to FIG. 1A, the signature recording device 60 in FIG. 2A also receives recording pulses (FIG. 2E) which exactly correspond to the clock pulse applied via lines 10 (FIG. 2D). Upon receipt of a recording pulse, the signature recording device 60 records any signature increment bit total available at its input.

FIG. 2G is a chart showing examples of the recorded signature increment bit totals corresponding to the gate outputs shown in FIG. 2F. Note that indeterminate signature pattern bits are effectively blocked from being received by the parallel adder 140, and are therefore ignored in arriving at the recorded signature increment bit totals. Thus, the way in which this prior art device addresses the indeterminate signature pattern problem is to use the gates 130, 131, 132 ... 130+N to prevent any indeterminate signature pattern bits from reaching the parallel adder 140 and, thus, from being included in the increment total.

Although this approach addresses the indeterminate signature increment problem to avoid faulty signature recording, it also has been found disadvantageous in that the treating of individual indeterminate signature bits requires complicated construction and programming. In regard to the programming, note that a control pattern increment must be provided to control the gating action of the gates 130, 131, 131, ... 130+N for each signature pattern increment. This is expensive and time consuming, because a control pattern must be formulated, possibly for millions of signature pattern increments, and then input into the gate control memory 110.

As a result of the complicated construction and programming, many signature analysis users have opted to ignore this approach and, instead, to utilize the cheaper, but still disadvantageous, approach which was described with reference to FIG. 1A. Consequently, there exists a need for an improved approach in dealing with indeterminate signature pattern increments in signature analysis testing of digital devices. More specifically, there exists a need for improvements which are neither complicated nor expensive in construction or programming.

SUMMARY OF THE INVENTION

The present invention provides a unique method and device for satisfying the aforementioned needs.

More specifically, the present invention addresses the indeterminate signature increment problem by using a control pattern which provides the clock count values at which it is known that an indeterminate signature increment will occur. Rather than attempting to control a plurality of gates to mask out individual bits, the present invention simply inhibits the recording or processing clock pulse during clock count values where an indeterminate increment occurs. This result is accomplished by using a comparator to compare the sequential clock count values of the control pattern to the actual clock count, and inhibiting the clock pulses when a match occurs. Since a single recording pulse is controlled, rather than a plurality of gates, the method, circuitry and programming needed are less complicated, less expensive and easily implemented.

It is, therefore, an important object of this invention to provide a simple and inexpensive method for treating the indeterminate signature pattern increments in an RPT signature testing system.

Another object of this invention is to provide a device of simple and inexpensive construction for treating the indeterminate signature pattern increments in an RPT signature testing system.

A further object of this invention is to provide a method to treat indeterminate signature pattern increments, wherein the programming to implement the method is simple and inexpensive.

An additional object is to provide a device to treat indeterminate signature pattern increments, wherein the required programming is simple and inexpensive to implement.

Still another object of the present invention is to provide control over a single processing pulse rather than over individual signature pattern bits.

These and other objects and advantages of the invention will become more fully apparent from the following description made in connection with the accompanying drawings, wherein:

BRIEF DESCRIPTION OF THE DRAWINGS

FIG. 1A is a simplified circuit diagram of a prior art device which produces signature analysis of devices under test.

FIG. 1B is a chart showing examples of the test pattern increments used in the device shown in FIG. 1A.

FIG. 1C is a chart showing examples of signature pattern increments produced by the device under test shown in FIG. 1A.

FIG. 1D is a diagram of the clock pulses applied to the device described in FIG. 1A.

FIG. 1E is a diagram of the clock pulses applied to the signature recording device in the device described in FIG. 1A.

FIG. 2B is a chart showing examples of the test pattern increments used in the device shown in FIG. 2A.

FIG. 2C is a chart showing examples of signature pattern increments produced by the device under test shown in FIG. 2A.

FIG. 2D is a graph showing the clock pulses applied to the device shown in FIG. 2A.

FIG. 2E is a graph showing the recording pulses applied to the signature recording device in the device shown in FIG. 2A.

FIG. 2F is a chart showing examples of the gate outputs of the device shown in FIG. 2A.

FIG. 3A is a simplified circuit diagram of a signature analysis device utilizing a preferred embodiment of the present invention.

FIG. 3B is a chart showing examples of test pattern increments used in the device shown in FIG. 3A.

FIG. 3C is a chart showing examples of the signature pattern increments produced by the device under test shown in FIG. 3A.

FIG. 3D is a graph showing the clock pulses applied to the device shown in FIG. 3A.

FIG. 3E is a graph showing the recording pulses applied to the signature recording device in the device shown in FIG. 3A.

FIG. 3F is a chart showing an examples of the signature pattern increments recorded by the device shown in FIG. 3A.

DESCRIPTION OF THE PREFERRED EMBODIMENTS

Figure 2A:
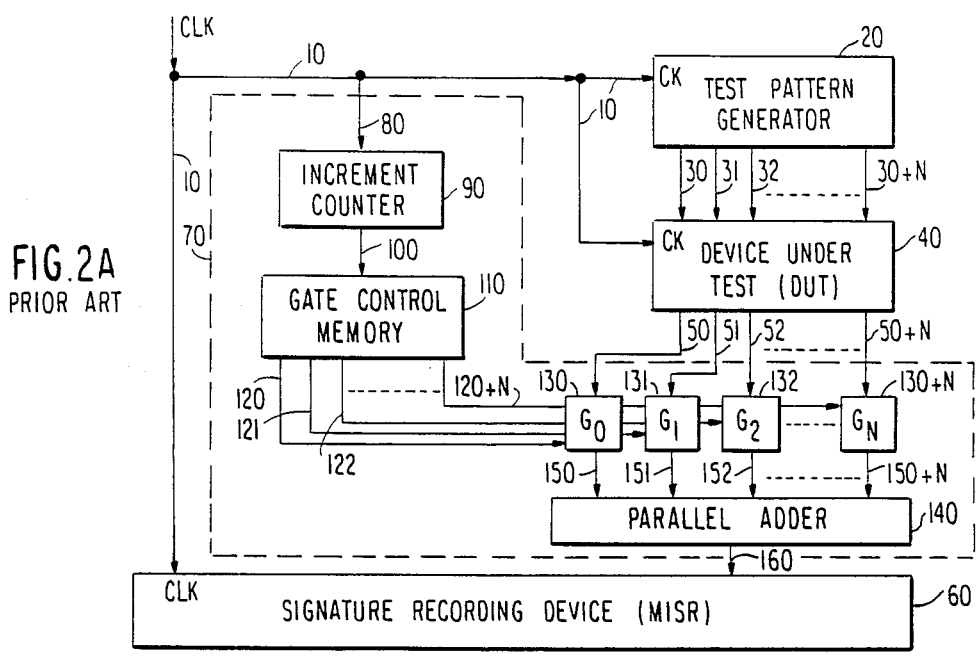
FIG. 2A is a simplified circuit diagram of prior art signature analysis device which treats individual indeterminate signature pattern bits.

FIG. 3A shows a simplified circuit diagram of a signature analysis device utilizing a preferred embodiment of the present invention. Again, circuit elements having functions similar to circuit elements in FIG. 1A and 2A have been assigned the same reference numerals.

Before turning to a detailed description of the preferred embodiment shown in FIG. 3A, it should be mentioned that FIGS. 3B, 3C and 3D correspond, respectively, to the test pattern increments, signature pattern increments, and the clock pulses encountered in the FIG. 3A device. These figures correspond exactly to FIGS. 1B, 1C and 1D, and to FIGS. 2B, 2C, and 2D as described with respect to the devices shown in FIGS. 1A and 2A, respectively.

In FIG. 3A, there is shown a signature analysis system which is similar to that of FIG. 1A, but with the addition of a preferred embodiment of the present invention as shown within the dashed area 200. In FIG. 3A a counter 210 is connected to receive the clock pulses applied along lines 10. The counter 210 produces a clock pulse count which corresponds to the number of clock pulses received from lines 10. FIG. 3D is a graph showing the clock pulses applied along lines 10. The clock pulse count output along line 220 is applied to the first input of a comparator 230. The second input of the comparator 230 receives the output of a memory 240 along line 250. The contents of the memory 240 are values of successive clock pulse counts at which a known indeterminate signature pattern increment will be encountered.

When the clock pulse count at the first input of the comparator 230 matches the known indeterminate count value at the second input to the comparator 230, the comparator 230 outputs a signal along line 260 to reflect an indeterminate state. This signal is fed back to the memory 240 to cause the memory 240 to increment to the next indeterminate count value.

The signal on line 260 is also fed to the first input of an AND gate 270. The second input of the AND gate 270 receives from line 10 the clock pulses which have been delayed by a delay element 280.

During clock pulse counts at which determinate signature pattern increments will be encountered at the inputs to the signature recording device 60, a match will not be encountered at the inputs to the comparator 230. During these clock pulse counts, the signal from the comparator 230 to the first input of the AND gate 270 is such that the delayed clock pulses at the second input are allowed to pass through the AND gate 270 and be outputted as recording pulses.

FIG. 3E is a graph showing recording pulses occurring at times D, D+2 and D+3 which exactly correspond to the determinate signature pattern increments at clock pulse counts D, D+2 and D+3 in FIG. 3C. These recording pulses are applied to the clock input of the signature recording device 60 along a line 300. Thus, during clock pulse counts where determinate signature pattern increments are encountered at the inputs of the signature recording device 60, the signature recording device 60 will receive a recording pulse along line 300, and will record the determinate signature pattern increment.

At clock pulse counts during which indeterminate signature pattern increments will be encountered at the inputs to the signature recording device 60, a match will be encountered at the inputs to the comparator 230. During these clock pulse counts, the signal reflecting an indeterminate state from the comparator 230 to the first input of the AND gate 270 is such that the delayed clock pulses at the second input are not allowed to pass through the AND gate 270. FIG. 3E indicates an absence of recording pulses at times D+1 and D+4 which exactly correspond to the indeterminate signature pattern increments at clock pulse counts D+1 and D+4 in FIG. 3C. Thus, during clock pulse counts where indeterminate signature pattern increments are encountered at the inputs of the signature recording device 60, the signature recording device 60 will not receive a recording pulse along line 300 and, therefore, will not record the indeterminate signature pattern increment.

FIG. 3E shows a graph of the recording pulses received by the signature recording device 60 in FIG. 3A. Since the present invention uses the approach of controlling the recording pulse to treat indeterminate signature pattern increments, there are two major differences between the recording pulses of the present invention and the recording pulses of the prior art devices previously described.

First, time D corresponds to the first possible time when a recording pulse can be generated, as can be seen in FIG. 3E. This time D exactly corresponds to the delay time D required for the first signature pattern increment to appear at the inputs of the signature recording device 60. Thus, the treatment of the first occurrence of the recording pulses in the present invention is different from the treatment of recording pulses in the previously described prior art devices where the time of first occurrence is irrelevant.

Second, since the present invention uses the recording pulses to address the indeterminate increment problem, there is an absence of recording pulses at any clock pulse counts where an indeterminate signature pattern increment appears at the inputs of the signature recording device 60, a feature which is in sharp contrast to the previously described prior art devices where the continuous clock pulses applied to lines 10 are also used as recording pulses. These two differences can easily be seen from a comparison of the recording pulses in FIGS. 1E and 2E with the recording pulses in FIG. 3E.

FIG. 3F is a chart showing the recorded signature pattern increments which have been recorded as a result of the processing described above. From the chart in FIG. 3F, it can seen that signature pattern increments have been recorded by the signature recording device 60 at times D, D+2 and D+3 which exactly correspond to the determinate signature pattern increments of FIG. 3C. Thus, the present invention treats each signature pattern increment as a whole, resulting in the recording of only determinate signature pattern increments, while indeterminate signatures are ignored and not recorded.

In addition to being simpler in circuit construction, the present invention is also advantageous over the prior art approach of FIG. 2A with regard to programming. As mentioned previously, programming with the prior art approach requires that a control pattern increment be provided to control the gating action for each signature pattern increment; thus, if the digital test pattern is a million increments long, the control pattern must also be a million increments long. In contrast, programming with the present invention requires only that there be provided sequential clock count values where indeterminate increments will occur. This control pattern program can be easily formulated by fault simulating a good device model with the pseudo-random RPT test pattern, and then recording the resulting clock pulse counts during which an indeterminate increment occurs. Although a digital test pattern may be millions of increments long, indeterminate states might occur during only a hundred increments, whereupon the control pattern need be only a corresponding hundred increments long. Thus, the present invention provides tremendous time savings in regard to the formulation and inputting of a much shorter control program.

It should be noted at this point that the signature recording device 60 may be replaced with some other form of processing device, without departing from the scope of this invention. For example, it may be desired that a comparison device make an immediate comparison of the signature pattern increment with a known good signature pattern increment, rather than recording the signature pattern increment for a later comparison. Thus, the recording pulse described above can more generally be called a processing pulse (i.e., recording being just one form of processing that may be implemented.).

Figure 4:
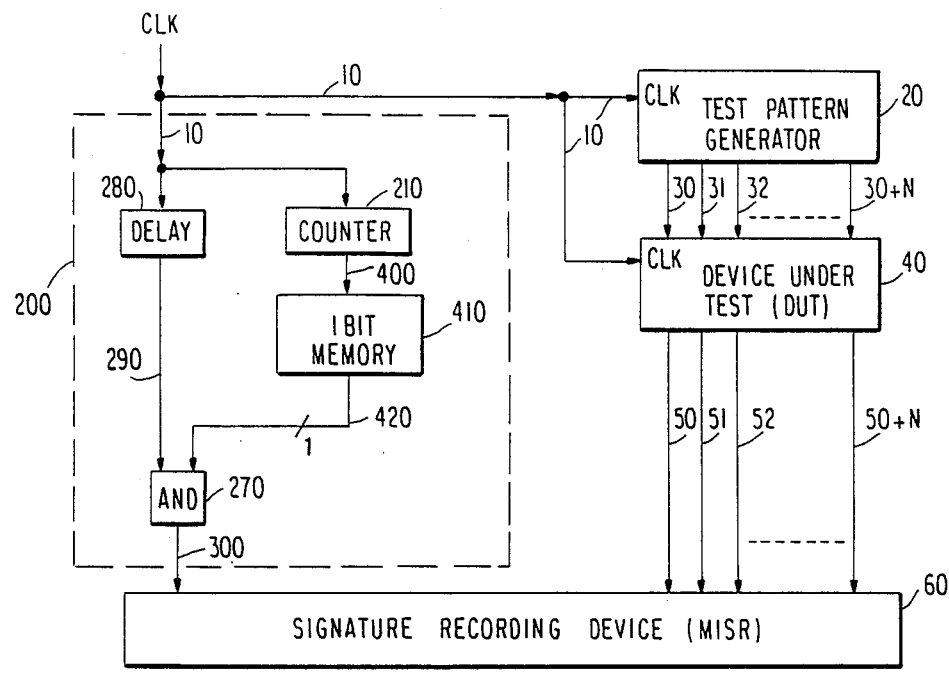
FIG. 4 is a circuit diagram of a circuit analysis device utilizing an alternative preferred embodiment of the present invention.

FIG. 4 shows a simplified circuit diagram of another preferred embodiment of the present invention as shown in the dashed area 200. Clock pulses received by the signature analysis device along lines 10 are fed to a counter 210. The counter 210 produces a clock pulse count which is applied along a line 400 to the address inputs of a one-bit memory 410 to increment through the memory array. The 1's and 0's in the successive one-bit memory locations are applied to a first input of an AND gate 270 along line 240 to control the gating of the clock pulses through the AND gate 270. Thus, the one-bit memory 410 is loaded, and its outputs cause the AND gate to be gated on during clock pulse counts where the signature pattern increment is determinate, and gated off during clock pulse counts where the signature pattern increment is indeterminate. Again, the delay of the clock pulses through the device 200 is chosen such that recording pulses will be outputted by the AND gate 270 along line 300 at the exact times when a determinate signature pattern is being applied to the input of the signature recording device 60. FIGS. 3A through 3F also apply to FIG. 4.

Figure 2G:
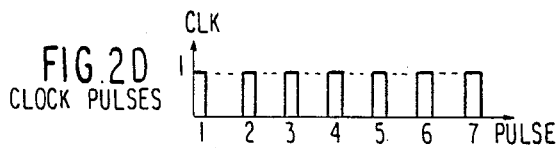
FIG. 2G is a chart showing examples of the recorded signature bit totals produced by the device shown in FIG. 2A.

Although the embodiment of FIG. 4 represents a further simplification of the processing pulse control circuit, note that there is a programming tradeoff in that the control pattern must have as many increments as the RPT test pattern, as was the case for the prior art device of FIG. 2. However, note that this embodiment is still advantageous over the prior art approach in that only one bit per increment is needed, as opposed to a plurality of bits to control a plurality of gates.

Thus, the described embodiments of the present invention provide a simple method and device having inexpensive construction and programming, such that indeterminate signature pattern increments can be efficiently treated in a signature analysis testing device.

The present invention and many of its intended advantages will be understood from the foregoing description, and it will be apparent that various changes may be made in the form, construction and arrangement of the parts thereof, without departing from the spirit and scope of the invention, the form hereinbefore described being merely preferred or exemplary embodiments of the invention whose scope is defined by the following claims.

What is claimed is:

1. A processing pulse control circuit for use in treating indeterminate signature increments in an apparatus for producing signature analysis of digital circuits, said processing pulse control circuit comprising:
    clock source means for providing clock pulses;
    indicator means for providing, for each clock pulse count, an indication of whether a signature is determinate or indeterminate;
    processing pulse output means for outputting said clock pulses during clock pulse counts at which a signature is determinate; and
    processing pulse control means, connected to said clock source means and said processing pulse output means, for normally passing clock pulses from said clock source means to said processing pulse output means during clock pulse counts at which the signature is determinate, and not passing clock pulses during clock pulse counts at which the signature is indeterminate.

2. A processing pulse control circuit as claimed in claim 1, wherein said indicator means comprises:
    memory means for supplying indeterminate count values at which indeterminate signature increment will be encountered; and
    wherein said processing pulse control means comprises:
    counter means receiving the clock pulses from said clock source means and producing a count in response thereto;
    comparator means for producing a control signal in response to a comparison of the count from said counter means with the indeterminate count values from said memory means, said control signal reflecting a determinate state when the comparison does not result in a match, and reflecting an indeterminate state when the comparison does result in a match; and
    switch means having an input terminal connected to receive the clock pulses from said clock source means, an output terminal which corresponds to said processing pulse output means, and a control terminal receiving the control signal from said comparator means, said switch means for passing the clock pulses from said clock source means to said processing pulse output means when said control signal reflects a determinate state, and not passing the clock pulses when said control signal reflects an indeterminate state.

3. A processing pulse control circuit as claimed in claim 2, wherein said switch means is an AND gate having a first input terminal connected to receive the clock pulses from said clock source means, a second input terminal connected to receive the control signal from said comparator means, and an output terminal which corresponds to said processing pulse output means.

4. A processing pulse control circuit as claimed in claim 2, wherein said clock pulses outputted by said processing pulse output means are used as recording pulses to control the recording of the signature increments.

5. A processing pulse control circuit as claimed in claim 1, wherein said clock source means comprises a terminal receiving system clock pulses from said apparatus for producing signature analysis.

6. A processing pulse control circuit as claimed in claim 1, wherein said processing pulse control means comprises:
    counter means receiving the clock pulses from said clock source means and producing a count in response thereto;
    wherein said indicator means comprises memory means for supplying a control signal reflecting whether a signature pattern increment is in a determinate or indeterminate state, said memory means receiving the count from said counter means as an address input, the addressed memory location outputs corresponding to said control signal; and
    wherein said processing pulse control means further comprises switch means having an input terminal connected to receive clock pulses from said clock source means, an output terminal which corresponds to said processing pulse output means, and a control terminal receiving the control signal from said memory means, said switch means allowing the clock pulses from said clock source means to appear on the processing pulse output means when said control signal reflects a determinate state, and not allowing the clock pulses to appear when said control signal reflects and indeterminate state.

7. A method for controlling processing pulses for treating indeterminate signature increments in devices which produce signature analysis of digital circuits, said method comprising the steps of:
    providing a source of clock pulses; and
    providing, for each clock pulse count, an indication of whether a signature is determinate or indeterminate;
    allowing said clock pulses to be outputted as processing pulses during clock pulse counts at which the signature is determinate, and not allowing said clock pulses to be outputted during clock pulse counts at which the signature is indeterminate.

8. An apparatus for producing signature analysis of digital circuits, wherein indeterminate signature increments may be encountered, the improvement comprising:
    a processing pulse control circuit comprising:
    clock source means for providing clock pulses;
    indicator means for providing, for each clock pulse count, an indication of whether a signature is determinate or indeterminate;
    processing pulse output means for outputting said clock pulses during clock pulse counts at which the signature is determinate; and
    processing pulse control means, connected to said clock source means and said processing pulse output means, for normally passing clock pulses from said clock source means to said processing pulse output means during clock pulse counts at which the signature is determinate, and not passing clock pulses during clock pulse counts at which the signature is indeterminate.

9. In a method for producing signature analysis of digital circuits, wherein indeterminate signature increments may be encountered, an improved method of controlling processing pulses, comprising:
  providing a source of clock pulses; and
  providing, for each clock pulse count, an indication of whether a signature is determinate or indeterminate;
  allowing said clock pulses to be outputted as a processing pulses during clock pulse counts at which the signature is determinate, and not allowing said clock pulses to be outputted during clock pulse counts at which the signature is indeterminate.

10. A recording pulse control circuit for use in treating indeterminate signature pattern increments in an apparatus producing signature analysis of digital circuits, said recording pulse control circuit comprising:
  clock source means for providing clock pulses;
  indicator means for providing, for each clock pulse count, an indication of whether a signature is determinate or indeterminate;
  recording pulse output means for outputting said clock pulses during clock pulse counts at which the signature is determinate; and
  processing pulse control means, connected to said clock source means and said recording pulse output means, for normally passing clock pulses from said clock source means to said recording pulse output means during clock pulse counts at which the signature is determinate, and not passing clock pulses during clock pulse counts at which the signature is indeterminate.

11. A method to control recording pulses for treating indeterminate signature increments in devices which produce signature analysis of digital circuits, said method comprising the steps of:
  providing a source of clock pulses; and
  providing, for each clock pulse count, an indication of whether a signature is determinate or indeterminate;
  allowing said clock pulses to be outputted as recording pulses during clock pulse counts at which the signature is determinate, and not allowing said clock pulses to be output during clock pulse counts at which the signature is indeterminate.

* * * * *